US012676776B1

(12) United States Patent (10) Patent No.: US 12,676,776 B1

Kumar (45) Date of Patent: Jul. 7, 2026

(54) HYBRID-EMPHASIS EQUALIZATION CIRCUIT

(71) Applicant: Cadence Design Systems, Inc., San Jose, CA (US)

(72) Inventor: Vinod Kumar, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 190 days.

(21) Appl. No.: 18/610,458

(22) Filed: Mar. 20, 2024

(51) Int. Cl.
  *H04L 25/03* (2006.01)
  *H04L 25/49* (2006.01)

(52) U.S. Cl.
  CPC .. *H04L 25/03038* (2013.01); *H04L 25/03343* (2013.01); *H04L 25/4917* (2013.01)

(58) Field of Classification Search
  CPC ......... H04L 25/03038; H04L 25/03343; H04L 25/4917
  See application file for complete search history.

(56) References Cited

U.S. PATENT DOCUMENTS

| | | | | |
|---|---|---|---|---|
| 7,308,058 B2 * | 12/2007 | Zerbe | ................... | H04L 1/0003 |
| | | | | 375/259 |
| 9,942,030 B1 * | 4/2018 | Dickson | ................ | H04L 7/0337 |
| 10,728,060 B2 * | 7/2020 | Peng | ................ | H04L 25/03038 |
| 2006/0034358 A1 * | 2/2006 | Okamura | .......... | H04L 25/03343 |
| | | | | 375/295 |
| 2006/0181733 A1 * | 8/2006 | Yokoyama | ............. | H04N 1/001 |
| | | | | 358/1.15 |

* cited by examiner

*Primary Examiner* — Freshteh N Aghdam
(74) *Attorney, Agent, or Firm* — Mark H. Whittenberger; Holland & Knight LLP

(57) ABSTRACT

Embodiments included herein are directed towards a feed forward equalization (FFE) transmission circuit. The circuit may include a data serializer and data signal generator circuit and a most significant bit driver slice circuit configured to receive a first output from the data serializer and data signal generator circuit. The FFE transmission circuit may further include a least significant bit driver slice circuit configured to receive a second output from the data serializer and data signal generator circuit and a hybrid emphasis equalization slice circuit configured to receive a third output from the data serializer and data signal generator circuit.

18 Claims, 11 Drawing Sheets

* I is the high-speed input signal to the transmitter.
* I_DLY_BAR is the inverted version of 1 UI delayed high speed signal.

200

Impact of PAD Loading on GDDR7 Transmitter output.

400

| Previous Symbol ($I_{MSB\ DLY}$, $I_{LSB\ DLY}$) | Present Symbol ($I_{MSB}$, $I_{LSB}$) | Status of Proposed Equalization Scheme | Action |
|---|---|---|---|
| 00 | 00 | De-Emphasis | Logic low level is attenuated |
| 00 | 01 | Pre-Emphasis | Transition logic level is amplified |
| 00 | 11 | Edge-Emphasis | Slew of rising transition edge accelerated |
| 01 | 00 | Hi-Z | Equalization Circuit is in Hi-Z state |
| 01 | 01 | Hi-Z | Equalization Circuit is in Hi-Z state |
| 01 | 11 | Hi-Z | Equalization Circuit is in Hi-Z state |
| 11 | 00 | Edge-Emphasis | Slew of falling transition edge accelerated |
| 11 | 01 | Pre-Emphasis | Transition logic level is amplified |
| 11 | 11 | De-Emphasis | Logic high level is attenuated |

| $I_{MSB\_DLY}$ | $I_{LSB\_DLY}$ | PD | ND | Hybrid-emphasis Slice Status |
|---|---|---|---|---|
| 0 | 0 | 0 | 0 | Pull-Up Driver is ON<br>Pull-Down driver is OFF |
| 0 | 1 | 1 | 0 | Pull-Up Driver is OFF<br>Pull-Down driver is OFF |
| 1 | 0 | 1 | 0 | Pull-Up Driver is OFF<br>Pull-Down driver is OFF |
| 1 | 1 | 1 | 1 | Pull-Up Driver is OFF<br>Pull-Down driver is ON |

900

| Previous Symbol (bit one, bit zero) | Present Symbol (bit one, bit zero) | PD | ND | Action | Type of Equalization |
|---|---|---|---|---|---|
| 00 | 00 | 0 | 0 | Pull-Up Driver is ON, Pull-Down Driver is OFF (Logic low level will be attenuated due to additional Pull-Up Driver) | De-Emphasis |
| 00 | 01 | 1 After 1UI | 0 | Pull-Up Driver is ON for 1UI, Pull-Down Driver is OFF (Logic high transition is amplified due to additional Pull-Up Driver) | Pre-Emphasis |
| 00 | 11 | 1 After 1UI | 1 After 1UI | During transition Pull-up Driver is ON, Pull-Down Driver if OFF (Rising slew is increased due to additional Pull-Up Driver) | Edge-Emphasis |
| 01 | 00 | 0 After 1UI | 0 | During transition Pull-up Driver is OFF, Pull-Down Driver if OFF (Hi-Z) | Hi-Z |
| 01 | 01 | 1 | 0 | Pull-Up Driver is OFF, Pull-Down Driver if OFF (Hi-Z) | Hi-Z |
| 01 | 11 | 1 | 1 After 1UI | During transition Pull-up Driver is OFF, Pull-Down Driver if OFF (Hi-Z) | Hi-Z |
| 11 | 00 | 0 After 1UI | 0 After 1UI | During transition Pull-up Driver is OFF, Pull-Down Driver is OFF, Pull-Down Driver if ON (Falling slew is increased due to additional Pull-Down Driver) | Edge-Emphasis |
| 11 | 01 | 1 | 0 After 1UI | Pull-Up Driver is OFF, Pull-Down Driver is ON for 1 UI (Logic low transition is amplified due to additional Pull-Down Driver) | Pre-Emphasis |
| 11 | 11 | 1 | 1 | Pull-Up Driver is OFF, Pull-down driver is ON (Logic High level is attenuated due to additional Pull-Down Driver) | De-Emphasis |

FIG. 9

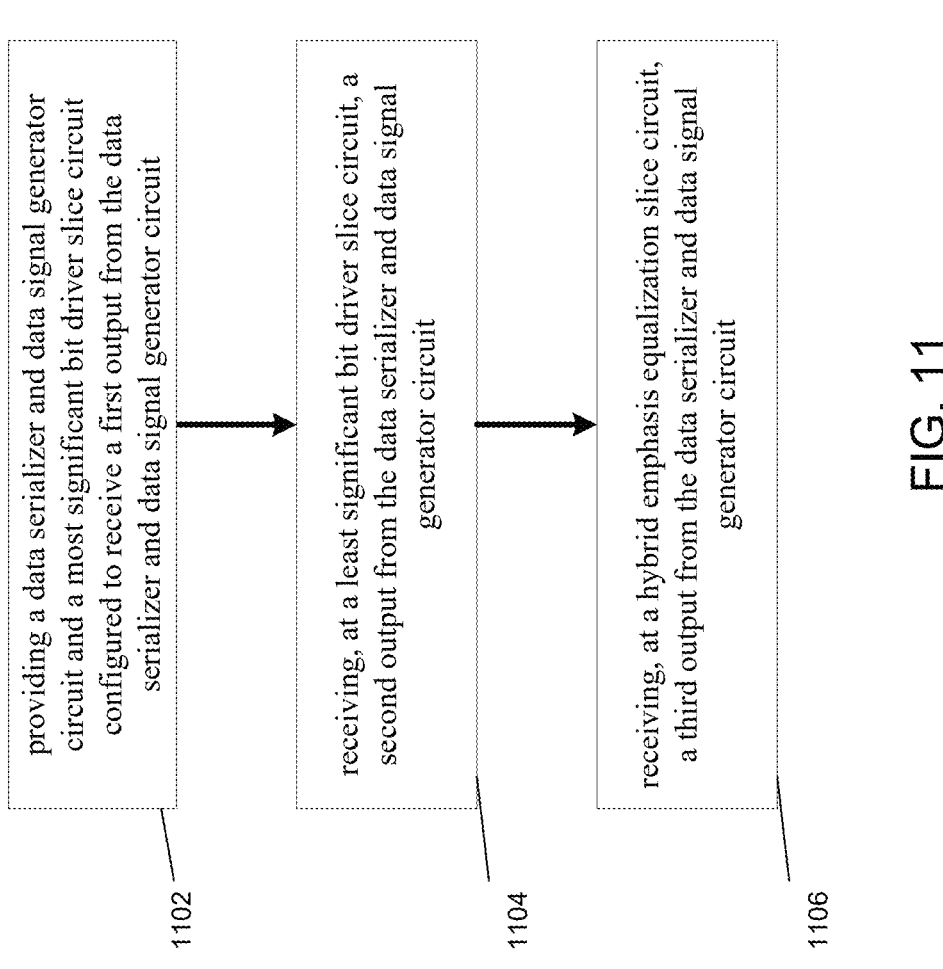

1100 providing a data serializer and data signal generator circuit and a most significant bit driver slice circuit configured to receive a first output from the data serializer and data signal generator circuit

1102 receiving, at a least significant bit driver slice circuit, a second output from the data serializer and data signal generator circuit

1104 receiving, at a hybrid emphasis equalization slice circuit, a third output from the data serializer and data signal generator circuit

HYBRID-EMPHASIS EQUALIZATION CIRCUIT

FIELD OF THE INVENTION

The present disclosure relates to electronic circuit transmission architecture, and more particularly, to a hybrid-emphasis equalization circuit that may be used with various modulation schemes.

BACKGROUND

Emerging technologies like three-dimensional (3D) gaming, artificial intelligence (AI), high-performance computing (HPC), graphics applications, and advanced driver assistance systems may require a very high bandwidth memory interface. As the speed goes higher the channel starts limiting the bandwidth of the interface for binary, non-return-to-zero (NRZ) signaling.

SUMMARY

In one or more embodiments of the present disclosure, a feed forward equalization (FFE) transmission circuit is provided. The circuit may include a data serializer and data signal generator circuit and a most significant bit driver slice circuit configured to receive a first output from the data serializer and data signal generator circuit. The FFE transmission circuit may further include a least significant bit driver slice circuit configured to receive a second output from the data serializer and data signal generator circuit and a hybrid emphasis equalization slice circuit configured to receive a third output from the data serializer and data signal generator circuit.

One or more of the following features may be included. The hybrid emphasis equalization slice circuit may include at least two different types of emphasis. The at least two different types of emphasis may include de-emphasis, pre-emphasis, and edge-emphasis. The hybrid emphasis equalization slice circuit may include a pull-up driver and a pull-down driver. The pull-up driver and the pull-down driver may receive a signal that adjusts an impedance of each driver. Each of the most significant bit driver slice circuit, least significant bit driver slice circuit, and hybrid emphasis equalization slice circuit may include a pre-driver and a transmission driver. The feed forward equalization transmission circuit may be associated with a PAM3 transmitter. Edge-emphasis may correspond to making a transition edge faster by reducing the effective impedance of the driver. The hybrid emphasis equalization slice circuit may receive a tap coefficient signal. The data serializer and data signal generator circuit may be configured to receive parallel input data and the data serializer and data signal generator circuit is 1 unit interval delayed.

In one or more embodiments of the present disclosure, a feed forward equalization transmission method is provided. The method may include providing a data serializer and data signal generator circuit and a most significant bit driver slice circuit configured to receive a first output from the data serializer and data signal generator circuit. The method may further include receiving, at a least significant bit driver slice circuit, a second output from the data serializer and data signal generator circuit. The method may further include receiving, at a hybrid emphasis equalization slice circuit, a third output from the data serializer and data signal generator circuit.

One or more of the following features may be included. The hybrid emphasis equalization slice circuit may include at least two different types of emphasis. The at least two different types of emphasis may include de-emphasis, pre-emphasis, and edge-emphasis. The hybrid emphasis equalization slice circuit may include a pull-up driver and a pull-down driver. The pull-up driver and the pull-down driver may receive a signal that adjusts an impedance of each driver. Each of the most significant bit driver slice circuit, least significant bit driver slice circuit, and hybrid emphasis equalization slice circuit may include a pre-driver and a transmission driver. The feed forward equalization transmission circuit may be associated with a PAM3 transmitter. Edge-emphasis may correspond to making a transition edge faster by reducing an effective impedance of the driver. The hybrid emphasis equalization slice circuit may receive a tap coefficient signal. The data serializer and data signal generator circuit may be configured to receive parallel input data and the data serializer and data signal generator circuit is 1 unit interval delayed.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 4 shows a table consistent with embodiments of the present disclosure;

FIGS. 8-9 show tables consistent with embodiments of the present disclosure; FIG. 11 shows a flowchart showing operations consistent with embodiments of the present disclosure.

DETAILED DESCRIPTION

Figure 1:
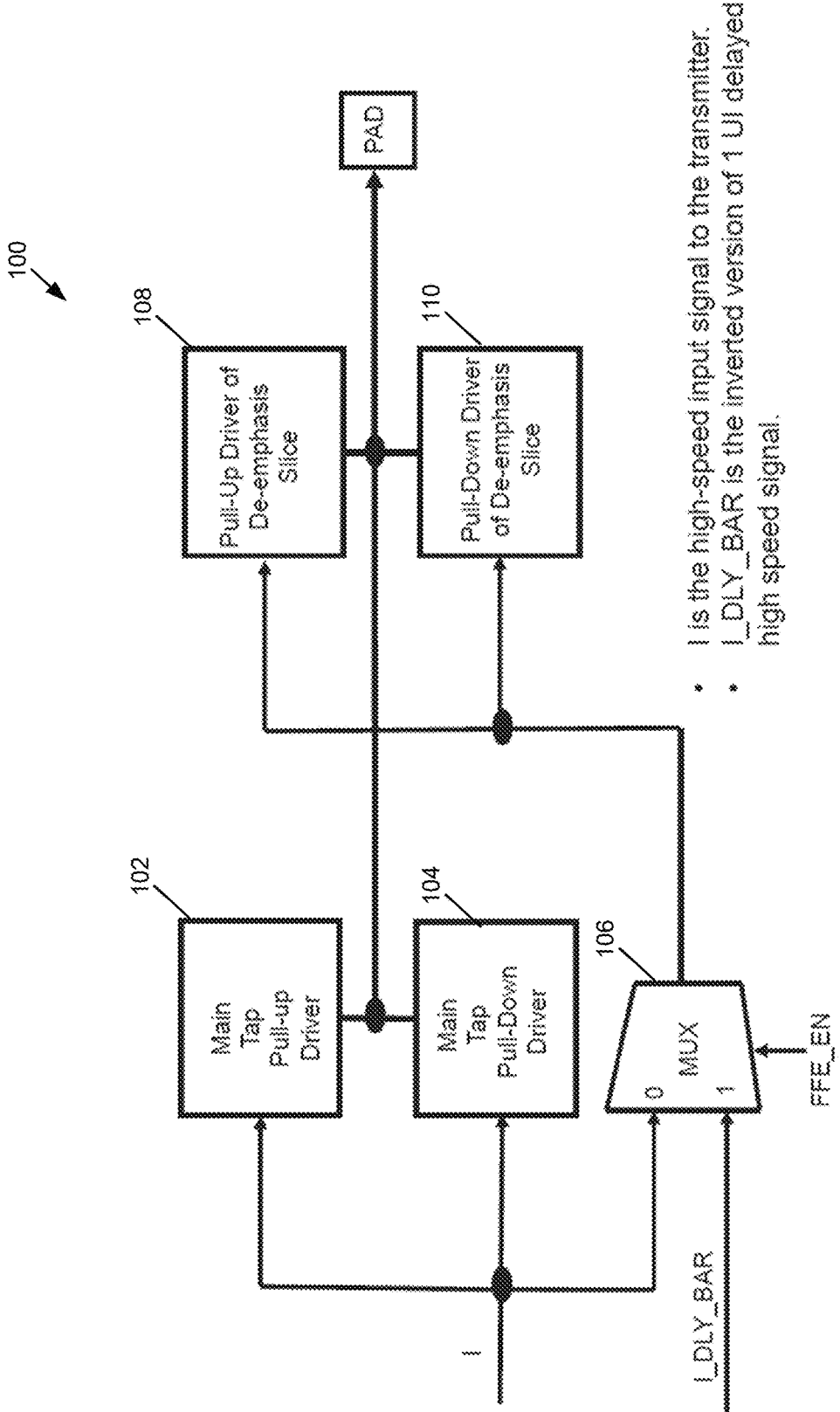
FIG. 1 shows a circuit of de-emphasis for feed forward equalization of a transmitter consistent with embodiments of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. Like reference numerals in the drawings denote like elements.

As used in any embodiment described herein, "circuit" or "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

In DDR NRZ signaling, only two bits of information may be transmitted in a clock cycle. For example, in order to get the 36 Gbps data rate in NRZ signaling the clock frequency needs to be 18 GHz which requires a channel bandwidth greater than 18 GHz. Most memory interface channel bandwidth is less than 10 GHz. Hence, it has become very difficult to transfer NRZ data on memory interface channels beyond 20 Gbps data rate. Therefore, the high bandwidth memories like GDDR7 are using PAM3 signaling to get the higher bandwidth for the memory interface. In PAM3 signaling the amplitude of the signal is modulated to transmit 3-bits of info per clock cycle. Therefore, for 36 Gbps PAM3 signaling the max frequency of clock will be 12 Ghz which requires at least 12 GHz channel bandwidth. Since most high-speed memory interface channel bandwidth is limited to 10 GHz, an effective equalization technique is needed for a GDDR7 PAM3 transmitter to achieve the per pin speed of 30 Gbps and beyond. The transmitter PAD loading also starts limited the interface bandwidth at higher data rate which also led to a need of equalization technique for GDDR7 PAM3 transmitter.

Referring now to FIG. 1, a circuit 100 showing one particular architecture of de-emphasis for feed forward equalization of a transmitter is provided. Circuit 100 includes main tap pull-up driver circuitry 102 and main tap pull-down driver circuitry 104. Main tap pull-up driver circuitry 102 and main tap pull-down driver circuitry 104 are operatively connected with multiplexer 106 as well as pull-up driver de-emphasis slice 108 and pull-down driver de-emphasis slice 110. In this particular circuit, the high-speed input signal to the transmitter is denoted by "I" and "I_DLY_BAR is the inverted version of 1 unit interval (UI) delayed high-speed signal. In this example, the de-emphasis slice driver will either driven by I or by I_DLY_BAR and hence the effective output driver impedance will remain the same. Therefore, the transition slew cannot be modulated in this particular de-emphasis architecture. This de-emphasis architecture makes the 11 . . . 01 . . . 00 transition and 00 . . . 01 . . . 11 transition worse in a PAM3 transmitter.

Figure 2:
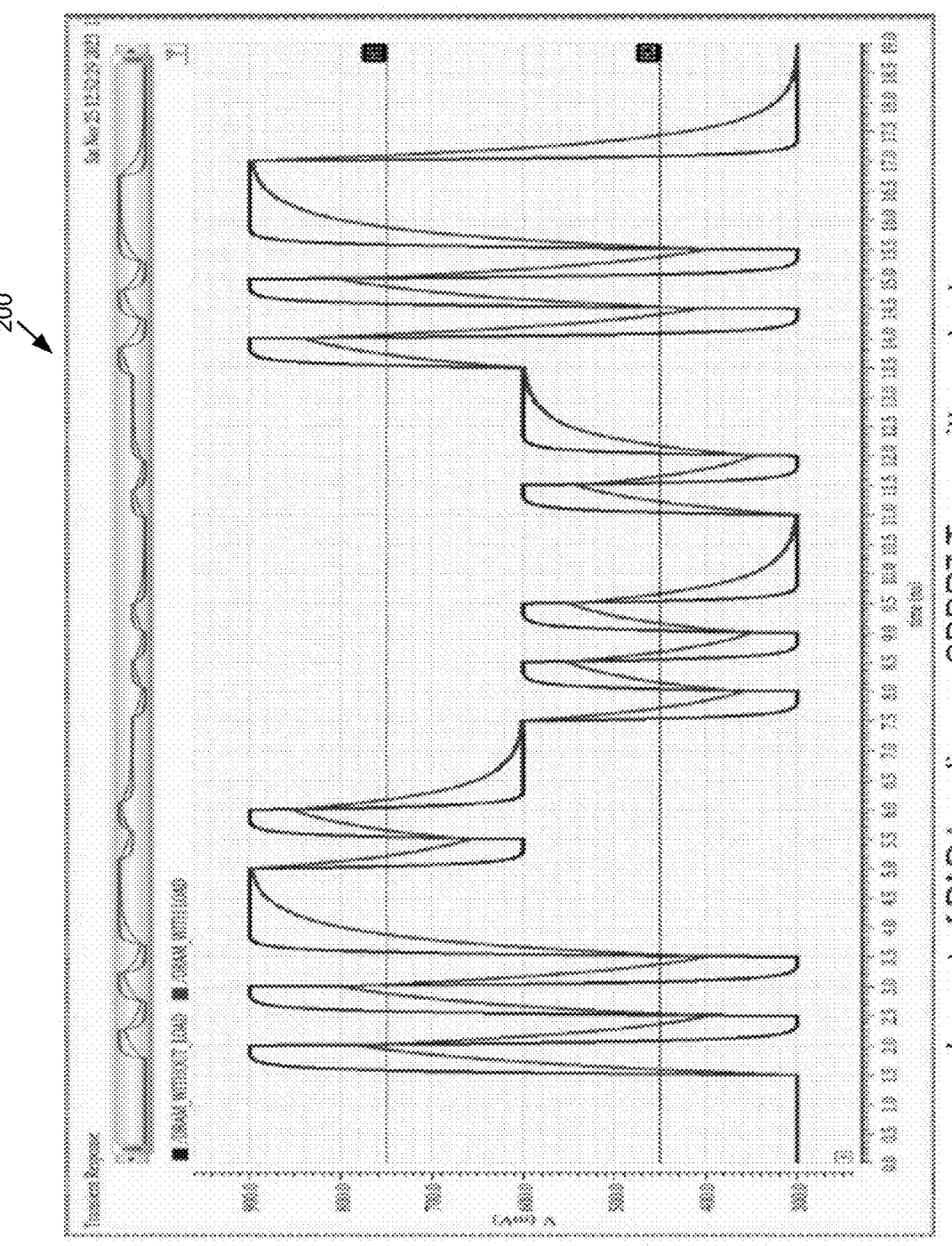
FIG. 2 shows a transient response diagram showing the impact of PAD loading on a GDDR7 transmitter output consistent with embodiments of the present disclosure.

Referring now to FIG. 2, a diagram 200 showing a transient response displaying the impact of PAD loading on a GDDR7 transmitter output is provided. As the speed of advanced DRAM like GDDR7 increases, the loading at the output of the transmitter and channel bandwidth starts limiting the bandwidth of the high-speed memory interface. Conventional transmitter equalization schemes used for NRZ signaling are not very effective for a GDDR7 memory interface transmitter that supports PAM3 signaling. The time domain feed forward equalization (TFFE) scheme is not effective for a PAM3 transmitter as it improves the 00 . . . 11 transition timing but degrades the 01 . . . 00 and 01 . . . 11 transition timing. Conventional feed forward equalization schemes using a de-emphasis approach are not very effective for PAM3 signaling as it improves the 00 . . . 11 transition and 11 . . . 00 transition but degrades the 00 . . . 01 . . . 11 and 11 . . . 01 . . . 00 transition. Conventional transition edge boosting schemes are also not very PPA efficient for PAM3 signaling as they increase the transmitter power and area. Accordingly, embodiments of the present disclosure address these issues. The present disclosure provides a new equalization scheme for a PAM3 transmitter that is more effective and efficient with respect to power, performance, and area.

Figure 3:
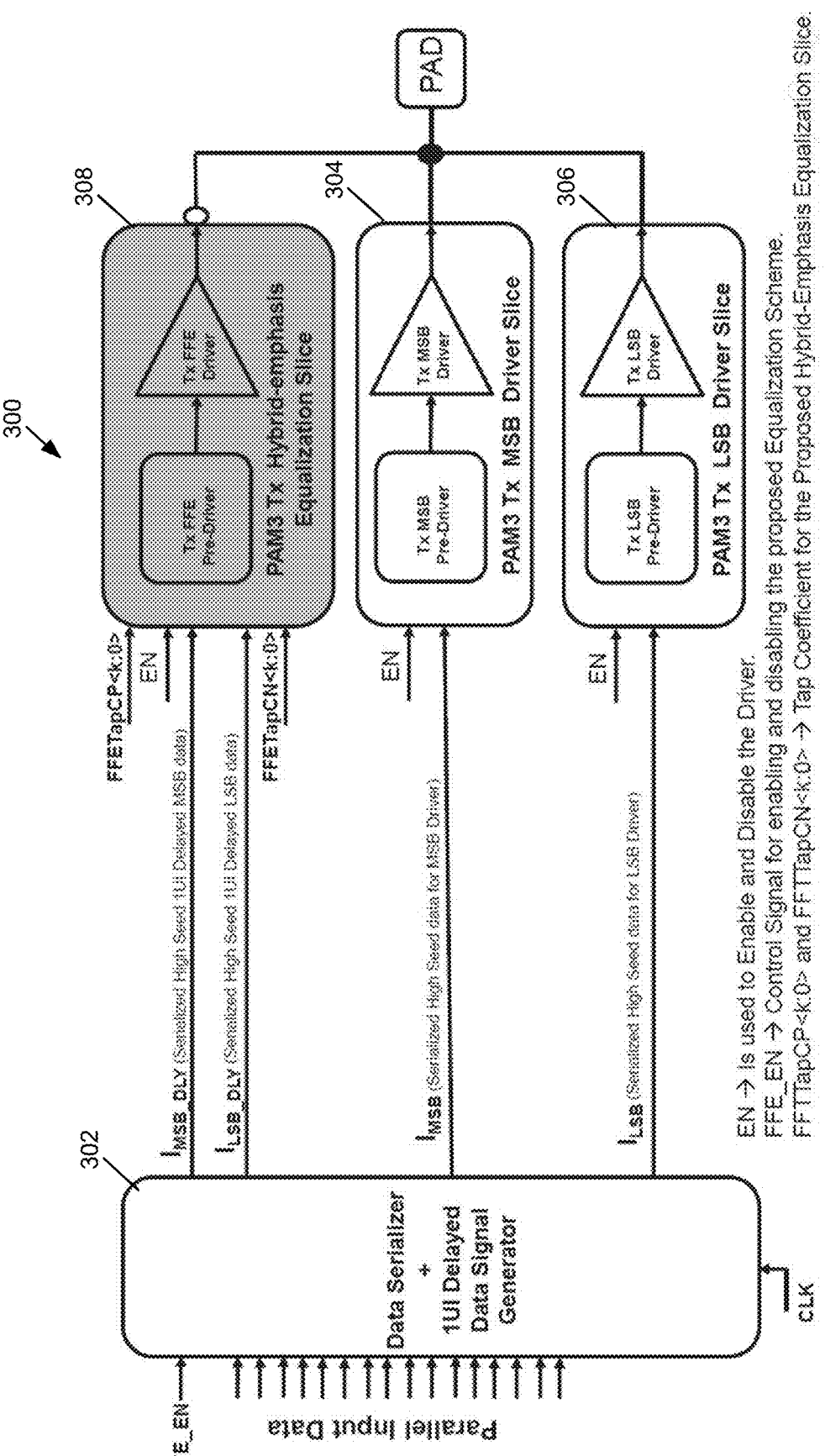
FIG. 3 shows a hybrid-emphasis equalization circuit of consistent with embodiments of the present disclosure.

In one or more embodiments of the present disclosure, a feed forward equalization (FFE) transmission circuit 300 is provided. Circuit 300 may include a data serializer and data signal generator circuit 302 and most significant bit driver slice circuit 304 configured to receive a first output from data serializer and data signal generator circuit 302. Data serializer and data signal generator circuit 302 may be configured to receive parallel input data and the data serializer and data signal generator circuit is 1 unit interval delayed as shown in FIG. 3.

In some embodiments, FFE transmission circuit 300 may further include least significant bit driver slice circuit 306 configured to receive a second output from data serializer and data signal generator circuit 302 and hybrid emphasis equalization slice circuit 308 configured to receive a third and fourth output from data serializer and data signal generator circuit 302.

In some embodiments, hybrid emphasis equalization slice circuit 308 may include at least two different types of emphasis. The at least two different types of emphasis for PAM3 signaling may include de-emphasis, pre-emphasis, and edge-emphasis. As used herein, the term "de-emphasis" may refer to attenuating the amplitude of signal for long 00 transition and long 11 transitions, the term "pre-emphasis" may refer to increasing the amplitude of the signal 00 to 01 transitions and 11 to 01 transitions and the phrase "edge-emphasis" may refer to making the transition edge faster by reducing the effective impedance of the driver for 00 to 11 and 11 to 00 transitions. Hybrid emphasis equalization slice circuit 308 may include a pull-up driver and a pull-down driver. The pull-up driver and the pull-down driver may receive a signal that adjusts an impedance of each driver. Each of most significant bit driver slice circuit 304, least significant bit driver slice circuit 306, and hybrid emphasis equalization slice circuit 308 may include a pre-driver and a transmission driver.

In operation, and as shown in the Table of FIG. 4, an enable signal (EN) may be used to enable and disable each driver. A control signal (FFE_EN) may be used for enabling and disabling data serializer and data signal generator circuit 302. Tap coefficient signals (FFTTapCP<k:0; and FFTTapCN<k:0>) may be used as inputs for hybrid emphasis equalization slice circuit 308 to adjust the impedance of hybrid emphasis equalization slice circuit 308.

Figure 5:
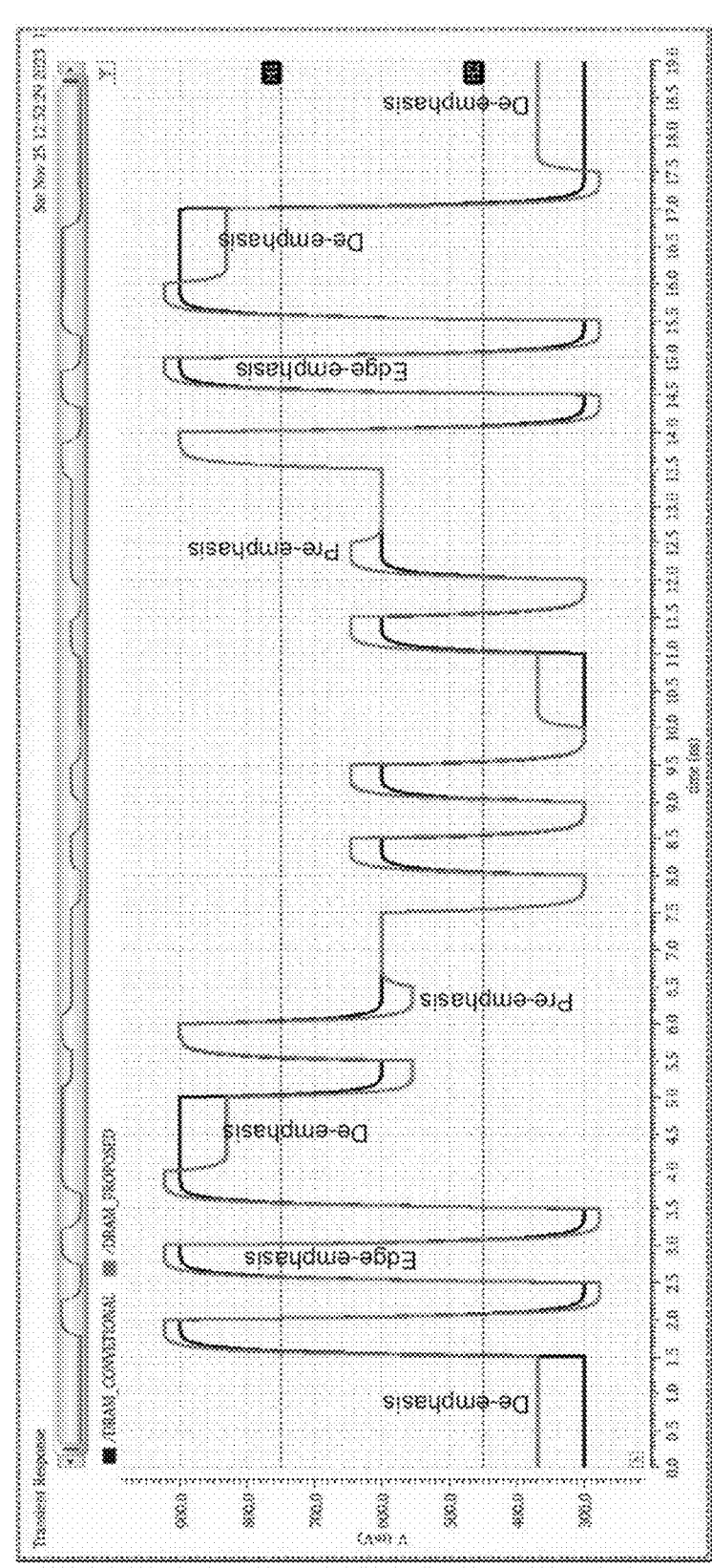
FIG. 5 shows a transient response diagram associated with a hybrid-emphasis equalization approach consistent with embodiments of the present disclosure.
Figure 6:
FIG. 6 shows another transient response diagram associated with a hybrid-emphasis equalization approach consistent with embodiments of the present disclosure.

FIGS. 5-6 show transient response diagrams associated with a hybrid-emphasis equalization approach consistent with embodiments of the present disclosure. FIG. 5 shows the impact of pre-emphasis, de-emphasis, and edge-emphasis on the output signal and lower data rate. FIG. 6 shows the impact of pre-emphasis, de-emphasis, and edge-emphasis on the output signal and higher data rate.

Figure 7:
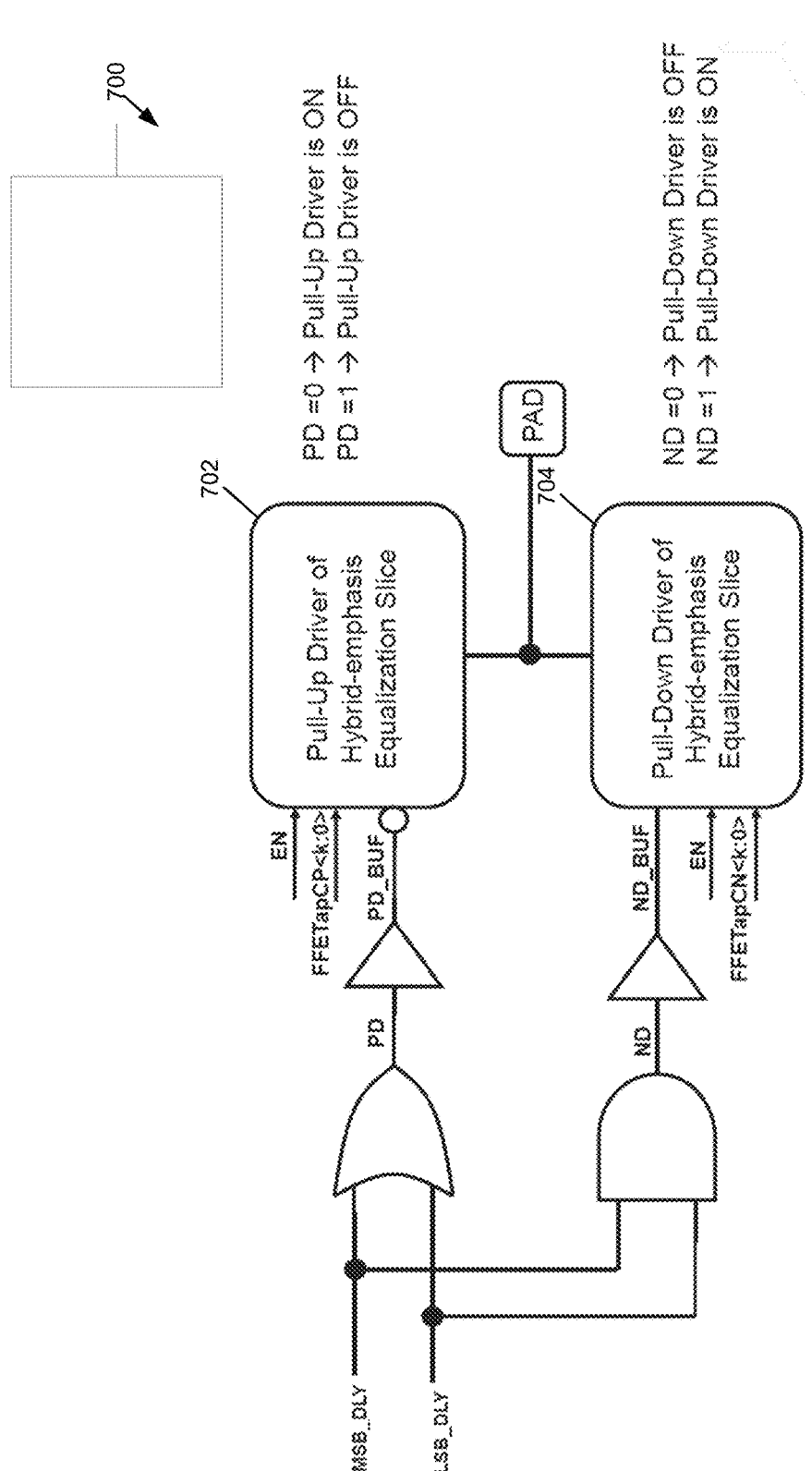
FIG. 7 shows a hybrid-emphasis equalization circuit of consistent with embodiments of the present disclosure.
Figure 8:

Referring now to FIG. 7, a hybrid-emphasis equalization slice circuit 700 consistent with embodiments of the present disclosure is provided. As discussed above, hybrid emphasis equalization slice circuit 700 may include pull-up driver 702 and pull-down driver 704. Pull-up driver 702 and pull-down driver 704 may receive a signal that adjusts an impedance of each driver. In operation, if the PD signal is 0, pull-up driver 702 may be ON and if the PD signal is 1, pull-up driver 702 may be OFF. If the ND signal is 0, pull-down driver 704 may be OFF and if the ND signal is 1, pull-down driver 704 may be ON. The tables shown in FIGS. 8-9 provide more details on the operation of hybrid-emphasis equalization slice circuit 700.

Figure 10:
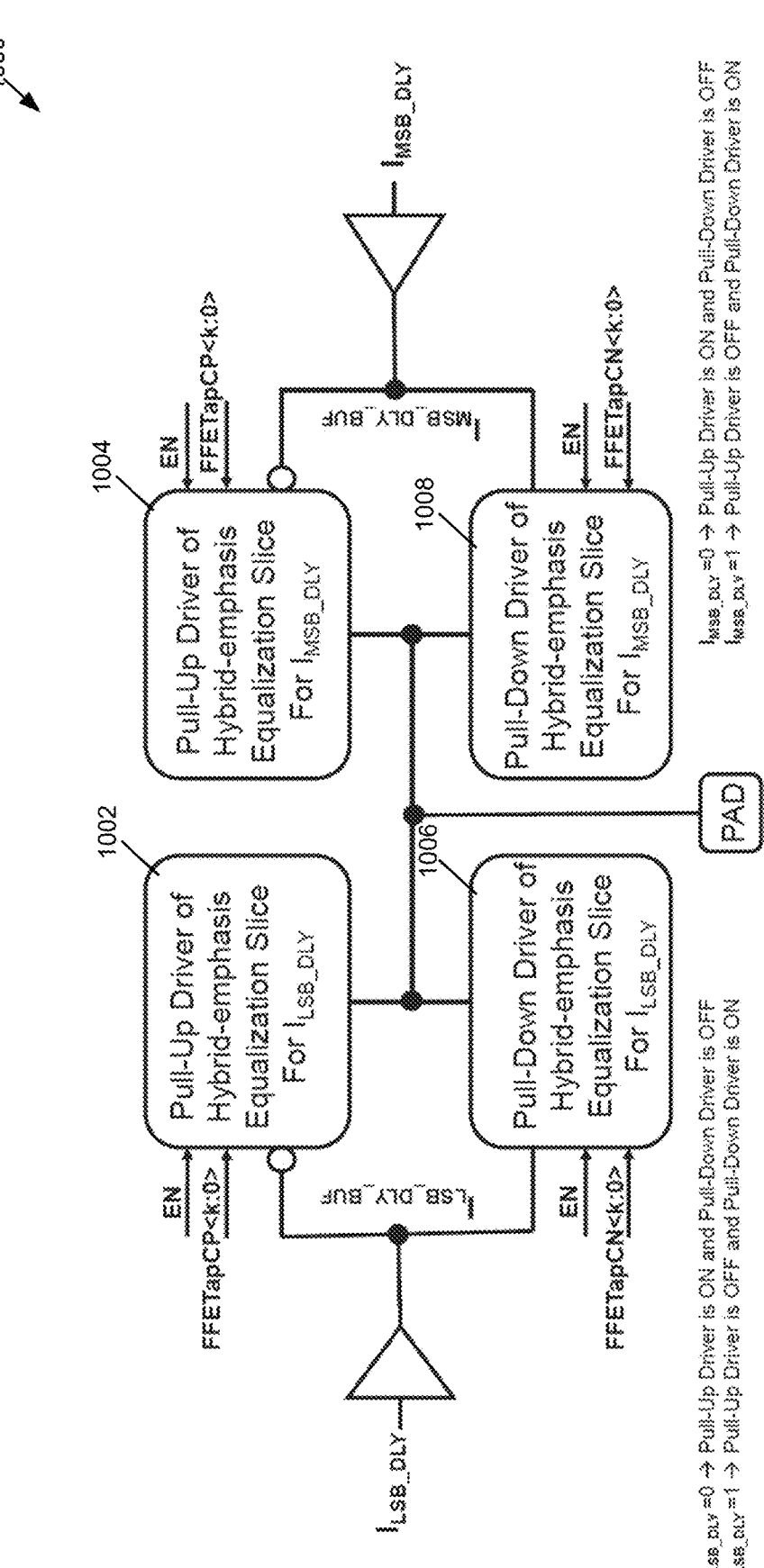
FIG. 10 shows a hybrid-emphasis equalization circuit of consistent with embodiments of the present disclosure.

Referring now to FIG. 10, another example of a hybrid-emphasis equalization circuit 1000 consistent with embodiments of the present disclosure is provided. Circuit 1000 includes LSB pull-up driver 1002, LSB Pull-down driver 1006 and MSB pull-up driver 1004, MSB pull-down driver 1008. The output of LSB pull-up driver 1002, LSB pull-down driver 1006, MSB pull-up driver 1004 and MSB pull-down driver 1008 are operatively interconnected to output node of Tx represented as PAD in FIG. 10.

FIG. 11 shows a flowchart showing operations consistent with embodiments of the feed forward equalization transmission method of the present disclosure is provided. The method may include providing (1202) a data serializer and data signal generator circuit and a most significant bit driver slice circuit configured to receive a first output from the data serializer and data signal generator circuit. The method may further include receiving (1204), at a least significant bit driver slice circuit, a second output from the data serializer and data signal generator circuit. The method may further include receiving (1206), at a hybrid emphasis equalization slice circuit, a third and fourth output from the data serializer and data signal generator circuit. Numerous other operations are also within the scope of the present disclosure.

Embodiments of the feed forward equalization transmission circuit and method disclosed herein provide numerous advantages over existing approaches. The hybrid-emphasis equalization approach of the present disclosure makes it possible to support the transmitter feed forward equalization, such as that associated with a GDDR7 memory interface. The proposed hybrid-emphasis equalization approach makes it possible to design a GDDR7 memory interface for 36 Gbps per pin speed which may provide, for example, 48 Gbps effective bandwidth for a GDDR7 interface. Using the teachings of the present disclosure may help to improve a transmitter eye-opening area by more than 50% (e.g., at 36 Gbps per pin speed). Embodiments included herein are very efficient in terms of power and area (e.g., requiring only an additional driver slice of value approximately 300 ohm).

Numerous other operations are also within the scope of the present disclosure. It will be apparent to those skilled in the art that various modifications and variations can be made in embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A feed forward equalization transmission circuit comprising:
   a data serializer and data signal generator circuit;
   a most significant bit driver slice circuit configured to receive a first output from the data serializer and data signal generator circuit;
   a least significant bit driver slice circuit configured to receive a second output from the data serializer and data signal generator circuit; and
   a hybrid emphasis equalization slice circuit configured to receive a third and fourth output from the data serializer and data signal generator circuit; and
   wherein the hybrid emphasis equalization slice circuit includes at least two different types of emphasis.

2. The circuit of claim 1, wherein the at least two different types of emphasis includes de-emphasis, pre-emphasis, and edge-emphasis.

3. The circuit of claim 1, wherein the hybrid emphasis equalization slice circuit includes a pull-up driver and a pull-down driver.

4. The circuit of claim 3, wherein the pull-up driver and the pull-down driver receive a signal that adjusts an impedance of each driver.

5. The circuit of claim 1, wherein each of the most significant bit driver slice circuit, least significant bit driver slice circuit, and hybrid emphasis equalization slice circuit include a pre-driver and a transmission driver.

6. The circuit of claim 1, wherein the feed forward equalization transmission circuit is associated with a PAM3 transmitter.

7. The circuit of claim 2, wherein edge-emphasis corresponds to making a transition edge faster by reducing an effective impedance of the driver.

8. The method of claim 1, wherein the hybrid emphasis equalization slice circuit receives a tap coefficient signal.

9. The method of claim 1, wherein the data serializer and data signal generator circuit is configured to receive parallel input data and the data serializer and data signal generator circuit is 1 unit interval delayed.

10. A feed forward equalization transmission method comprising:
   providing a data serializer and data signal generator circuit and a most significant bit driver slice circuit configured to receive a first output from the data serializer and data signal generator circuit;
   receiving, at a least significant bit driver slice circuit, a second output from the data serializer and data signal generator circuit; and
   receiving, at a hybrid emphasis equalization slice circuit, a third and fourth output from the data serializer and data signal generator circuit; and
   wherein the hybrid emphasis equalization slice circuit includes at least two different types of emphasis.

11. The method of claim 10, wherein the at least two different types of emphasis includes de-emphasis, pre-emphasis, and edge-emphasis.

12. The method of claim 10, wherein the hybrid emphasis equalization slice circuit includes a pull-up driver and a pull-down driver.

13. The method of claim 12, wherein the pull-up driver and the pull-down driver receive a signal that adjusts an impedance of each driver.

14. The method of claim 10, wherein each of the most significant bit driver slice circuit, least significant bit driver slice circuit, and hybrid emphasis equalization slice circuit include a pre-driver and a transmission driver.

15. The method of claim 10, wherein the feed forward equalization transmission circuit is associated with a PAM3 transmitter.

16. The method of claim 11, wherein edge-emphasis corresponds to making a transition edge faster by reducing an effective impedance of the driver.

17. The method of claim 10, wherein the hybrid emphasis equalization slice circuit receives a tap coefficient signal.

18. The method of claim 10, wherein the data serializer and data signal generator circuit is configured to receive parallel input data and the data serializer and data signal generator circuit is 1 unit interval delayed.

\* \* \* \* \*